United States Patent [19]

Yamamori et al.

[11] 4,382,496
[45] May 10, 1983

[54] TORQUE CONVERTER WITH LOCKUP CLUTCH UNIT

[75] Inventors: Takahiro Yamamori, Tokyo; Kazuyoshi Iwanaga; Kunio Ohtsuka, both of Yokohama, all of Japan

[73] Assignee: Nissan Motor Company, Limited, Yokohama, Japan

[21] Appl. No.: 222,151

[22] Filed: Jan. 2, 1981

Related U.S. Application Data

[63] Continuation of Ser. No. 957,610, Nov. 3, 1978.

[30] Foreign Application Priority Data

Sep. 13, 1978 [JP] Japan .............. 53-112645

[51] Int. Cl.³ .................................. F16D 33/00
[52] U.S. Cl. ........................................ 192/3.29
[58] Field of Search ............. 192/3.28, 3.29, 3.3, 192/3.31, 3.33, 3.22; 74/731, 732

[56] References Cited

U.S. PATENT DOCUMENTS

| | | | |
|---|---|---|---|
| 2,717,673 | 9/1955 | Zeidler | 192/3.21 |
| 3,185,273 | 5/1965 | Smirl | 192/3.3 |
| 3,235,043 | 2/1966 | Maurice et al. | 192/3.33 |
| 3,387,506 | 6/1968 | Cadiou | 192/3.33 |
| 3,398,603 | 8/1968 | Szodfridt et al. | 192/3.3 |
| 4,177,694 | 12/1979 | Lachaize | 192/3.22 |

FOREIGN PATENT DOCUMENTS

| | | |
|---|---|---|
| 1178270 | 9/1964 | Fed. Rep. of Germany . |
| 1337366 | 8/1963 | France . |
| 894109 | 4/1962 | United Kingdom . |
| 932698 | 7/1963 | United Kingdom . |
| 963394 | 7/1964 | United Kingdom . |

Primary Examiner—George H. Krizmanich
Attorney, Agent, or Firm—Schwartz, Jeffery, Schwaab, Mack, Blumenthal & Koch

[57] ABSTRACT

A converter fluid supply passage is situated between a transmission input shaft and a pilot sleeve shaft and a converter fluid return passage is defined between the transmission input shaft and the stationary sleeve shaft extension so that the annular space between the pump drive shaft and the transmission input shaft may be used only as a lockup control passage.

11 Claims, 4 Drawing Figures

PRIOR DEVICE 4,382,496

TORQUE CONVERTER WITH LOCKUP CLUTCH UNIT

This is a continuation of application Ser. No. 957,610, filed Nov. 3, 1978.

BACKGROUND OF THE INVENTION

This invention relates in general to a hydrokinetic torque converter assembly of the lockup clutch unit-equipped type for use in an automatic power transmission which is designed and constructed to be transversely mounted on a F-F type motor vehicle in which an engine such as an internal combustion engine is mounted at the front of the vehicle with the drive to the front wheels and, more particularly, to the improved fluid passage construction and arrangement for converter fluid supply and return circuits and a lockup control circuit incorporated in the hydrokinetic torque converter assembly of the above type.

In case of the F-F type motor vehicle having transversely mounted thereon an automatic power transmission, it is particularly desired to locate the final drive unit at the center of the vehicle, i.e. intermediate between the lateral sides of the vehicle body, so that the left and right axle shafts for respectively driving the left and right front wheels may have the same length. It is accordingly desired to locate the output gear of the power transmission as close as the possible to the center of the vehicle.

For this reason, it has been practiced to dispose the output gear immediately near the torque converter and the oil pump assembly of the power transmission in the transmission end portion far away from the torque converter. The pump drive shaft of the power transmission for driving the oil pump assembly is thus necessitated to be of a considerable length so as to extend throughout the ratio changing mechanism of the power transmission to drivingly interconnect the front converter cover of the power transmission and the oil pump assembly. The transmission input shaft employed in this type power transmission for transmitting the output of the torque converter to the ratio changing mechanism is constructed as a hollow shaft surrounding the pump drive shaft and is also necessitated to be of a considerable length as is well known in the art.

The hydrokinetic torque converter assembly of the lockup clutch unit-equipped type for the foregoing transverse automatic power transmission requires the provision of three kinds of fluid circuits including a converter fluid supply circuit, a converter fluid return circuit and a lockup control circuit. The converter fluid supply circuit is provided for supplying the converter working fluid from the source of fluid under pressure of the working circuit in the torque converter, and the converter fluid return circuit is provided for discharging the converter working fluid from the working circuit in the torque converter to the oil sump through the relief valve. The lockup control circuit is provided for alternatively actuating the lockup clutch unit into a lockup-applied condition or a lockup-released condition. The converter fluid supply circuit, the converter fluid return circuit and the lockup control circuit respectively includes a converter fluid supply passage, a converter fluid return passage and a lockup control passage which are necessary to be arranged between the concentrically disposed shafts of the torque converter.

Referring to FIG. 1 a hydrokinetic torque converter assembly of the foregoing type will be explained.

Reference numeral a indicates a pump drive shaft for driving an oil pump assembly, which is drivingly connected to a converter cover b driven by an engine. A transmission input shaft c surrounds the pump drive shaft a interposing therebetween a bushing d. The transmission input shaft c is drivingly connected to a turbine e and is journaled by means of a bushing g in the bore of a stationary sleeve shaft extension f of a cover member. The stationary sleeve shaft extension carries thereon a stator h by way of a one-way clutch assembly i and also carries thereon by way of a bushing j a pilot sleeve shaft l integrally connected to an impeller k. A lockup clutch unit is disposed in the converter cover b and includes a clutch piston m engageable with the converter cover b to rotate together therewith and a torsional damper assembly n interconnecting the clutch piston m and the turbine k.

Of the aforementioned three fluid passages, the lockup control fluid passage is defined by means of a central opening o formed in the pump drive shaft a, and the converter fluid supply passage is defined by means of an annular space p between the transmission input shaft c and the stationary sleeve shaft extension f and a radial bore q formed in the stationary sleeve shaft extension f. The converter fluid return passage is defined by means of an annular space s between the pump drive shaft a and the transmission input shaft c and a radial bore r formed in the transmission input shaft c.

The torque converter assembly thus constructed and arranged contours a drawback that the pump drive shaft a is inferior not only in mechanical strength but also in manufacturing cost since the central opening o is formed in the shafts a of a small cross section relative to its length. The prior art converter assembly is further undesirable in that the radial bore r is formed in the transmission input shaft c for transmitting a driving power, which inevitably deteriorates the mechanical strength of the transmission input shaft c.

It is accordingly an object of the present invention to provide a hydrokinetic torque converter assembly of the lockup clutch unit-equipped type which is improved to be free from the foregoing drawbacks in the torque converter assembly of the described type.

It is a further object of the present invention to provide a hydrokinetic torque converter assembly of the lockup clutch unit-equipped type in which the foregoing three fluid passages are constructed and arranged between the foregoing four concentrically disposed shafts without requiring the provision of an central opening in a pump drive shaft and a radial bore in a transmission input shaft.

BRIEF DESCRIPTION OF THE DRAWINGS

These and other objects and advantages of the present invention will become more apparent from the following description in conjunction with the accompanying drawings, in which:

FIG. 1 is a fragmentary sectional view of a prior torque converter assembly having a lockup clutch unit which the present invention is concerned with;

Referring now to FIGS. 2 and 3 inclusive, the reference numeral 10 generally indicates a hydrokinetic torque converter assembly of the lockup clutch unit-equipped type for a transverse automatic power transmission. That is, the hydrokinetic torque converter assembly 10 comprises a hydrokinetic torque converter 12 and a lockup clutch unit 14 and is adapted for alternatively transmitting power through the converter or directly through the clutch and thereby by-passing the converter. The torque converter 12 has a rotatable converter cover 16 comprising a forward cover part 18 and a rearward cover part 20 which are joined together by welding 22. The forward cover part 18 has attached thereto by welding a sleeve member 24 which has a center axis aligned with the axis of rotation of the converter cover 16. The sleeve member 24 is received within an opening formed in an adjacent end of a crankshaft (not shown) of an internal combustion engine such that the axis of rotation of the converter cover 16 is aligned with the axis of rotation of the crankshaft. The crankshaft is drivingly connected to the forward cover part 18 by means of a drive plate (not shown) such that the driving power from the crankshaft is transmitted to the converter cover 16 by way of the drive plate. The rearward cover part 20 is formed with a generally toroidal form and its hub 26 is welded to a pilot sleeve shaft 28 having a L-shaped section. The sleeve shaft 28 is journaled by means of a bushing 30 upon a stationary sleeve shaft extension 32 of a front cover member 34 which is detachably secured by bolts to a converter housing (not shown). A suitable fluid seal 36 is situated between the pilot sleeve shaft 28 and a surrounding adapter member 38 secured to the front cover member 34.

Figure 1:
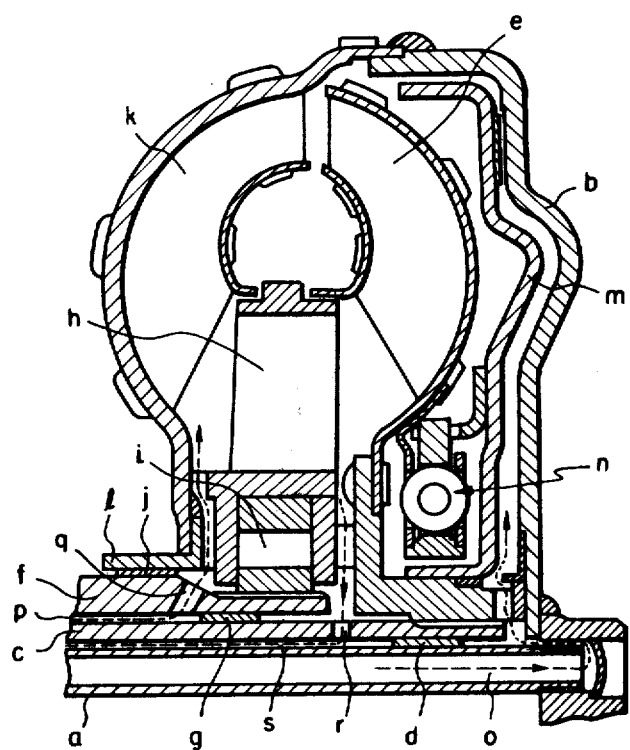

The torque converter 12 comprises an impeller 40, a turbine 42 and a stator 44 which are operatively associated to one another to define a converter working circuit as is well known in the art. The impeller 40 is attached by welding or otherwise secured to the rearward cover part 20, and the turbine 42 is riveted or otherwise secured to a flange portion 46 of a hub 48. The hub 48 is formed with a central splined opening 50 within which is splined a transmission input shaft 52 having a center axis aligned with the axis of rotation of the converter cover 16. The transmission input shaft 52 is supported by means of a bushing 53 upon the stationary sleeve shaft extension 32. Though not shown, the transmission input shaft 52 is drivingly connected to a ratio changing mechanism, for instance, sevo-controlled planetary gearing of a character that affords various forward and reverse drive ranges of operation. The stator 44 is mounted by means of a one-way clutch assembly 54 upon the stationary sleeve shaft extension 32 and is permitted to rotate about the centre axis of the transmission input shaft 52 in the same direction as the direction of the impeller 40 and accordingly the direction of rotation of an engine crankshaft. Though not shown, each of the impeller 40, the turbine 42 and the stator has a number of blades or vanes arranged and inclined in symmetry about the centre axis of the transmission input shaft 52. Concentrically disposed within the bore of the transmission input hollow shaft 52 is a pump drive shaft 56 which has a right-hand end splined to the sleeve member 24 and a left-hand end, though not shown, drivingly connected to an oil pump schematically shown at 58. Located between the hub 48 and the inner portion of the forward cover part 18 is an annular thrust washer 60 which defines an annular fluid chamber 61 around the pump drive shaft 56.

The lockup clutch unit 14 is disposed within the converter cover 16 and comprises an annular clutch piston 62 which is axially slidably mounted by an inner axially extending flange 64 on the hub 48. The hub 48 is provided with an annular seal 65 for sealing the mating surfaces of the hub 48 and the flange 64. The clutch piston 62 is provided with a flat annular friction surface 66 which is adapted to engage frictionally the friction surface 68 formed on the inside of the forward cover part 18. The clutch piston 62 and the forward cover part 18 are adapted to define therebetween a clutch chamber 70. When the clutch piston 62 moves to the right causing the friction surface 66 to engage the friction surface 68, the clutch chamber 70 is fluidly isolated from the remaining interior of the converter cover 16 and accordingly from the converter working circuit. The clutch chamber 70 is communicated with the annular fluid chamber 61 through radial passages 74 defined by notches 75 formed in the front axial end portion of the hub 48. The lockup clutch unit 14 further comprises an annular coupling member 76 which is secured by a suitable fastening means to the clutch piston 62 on the inside thereof. The coupling member 76 has an axially extending flange formed with a castellated end portion 78 to which is splined an externally splined drive plate 80 of a torsional damper assembly 82. The torsional damper assembly 82 further includes a front driven plate 84, a rear driven plate 86 and a torsional damping spring 88. The rear driven member 86 has a radially outwardly extending portion which is secured to the turbine 42. With these arrangements, the torsional damper assembly 82 provides driving connection between the clutch piston 62 and the turbine 42 in torsional vibration damping manner while allowing the clutch piston 62 to move relative thereto.

Figure 3:
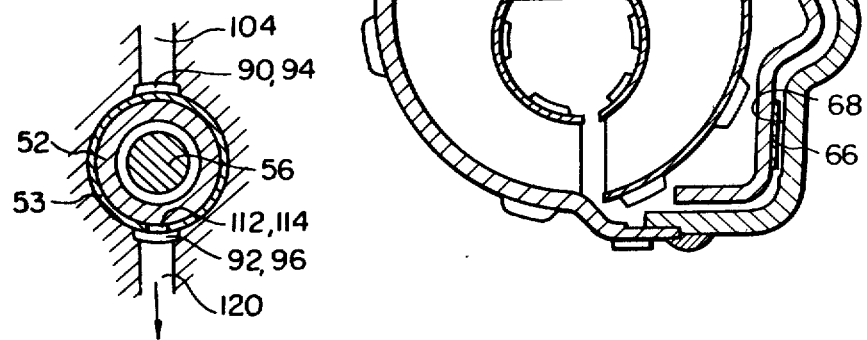
FIG. 3 is a cross sectional view taken generally along the line A—A of FIG. 2.

The stationary sleeve shaft extension 32 has formed in its inner surface portion or bore portion in contact with the outer surface of the bushing 53 a pair of axially extending grooves 90 and 92. The grooves 90 and 92 are adapted to cooperate with the bushing 53 to define a pair of fluid passages 94 and 96 which are fluidly isolated from each other as seen from FIG. 3. The fluid passage 94 has one end communicated with the interior or the working circuit of the torque converter 12 through a radial bore or passage 98 formed in the stationary sleeve shaft extension 32, a fluid chamber 100 located between the pilot sleeve shaft 28 and the stationary sleeve shaft extension 32, and an inlet passage 102 of the torque converter 12. The fluid passage 94 has the other end terminating in a fluid passage 104 which is communicated with a source of fluid under pressure 106 including the oil pump 58 and a pressure regulator valve 110. The fluid passage 96, on the other hand, has one end terminating in a fluid passage 112 which is defined by a notch 114 formed in the bushing 53, the transmission input shaft 52 and the stationary sleeve shaft 32. The passage 112 is communicated with the interior of the torque converter 12 through an annular bore or passage 116 defined between the transmission input shaft 52 and the stationary sleeve shaft extension 32 and an outlet passage 118 of the torque converter 12. The other end of the fluid passage 96 is terminated in a fluid passage 120 which is communicated with an oil sump 108 through a relief valve 122, on oil cooler 124 and lubricating points 126.

As described hereinbefore, the clutch chamber 70 is communicated with the fluid chamber 61 through the radial passages 74. The fluid chamber 61 is communicated with an annular passage 128 which is defined between the pump drive shaft 56 and the transmission input shaft 52. The annular passage 128 is in turn communicated with a lockup control valve unit 130 through a conduit 132. The lockup control valve unit 130 functions to alternatively connect the conduit 132 to a pressure conduit 134 leading to the source of fluid under pressure 106 or to a drain conduit 136 leading to the oil sump 108. The pressure regulator valve 110 receives the fluid under pressure pumped from the pump 58 through the line 138 and functions to regulate the line pressure supplied to a transmission control system supply line 140. The pressure regulator valve also delivers fluid under pressure to the fluid passage 104 and the pressure conduit 134.

The hydrokinetic torque converter assembly with a lockup clutch unit according to this invention thus constructed and arranged operates as follows:

The driving power from a crankshaft of an engine (not shown) is transmitted to the impeller 40 by way of the converter cover 16. The impeller 40 is thus kept rotating when the engine is in operation. The oil pump 58 is also kept driven by means of the pump drive shaft 56 when the engine is in operation.

When the vehicle, on which the torque converter assembly 10 is assumed to be mounted, is in the conditions unsuitable for lockup of the converter such as stall and accelerating conditions or low speed high load conditions, the lockup control valve unit 130 is conditioned to communicate the conduit 132 to the pressure regulator valve 110 through the conduit 134. The fluid under pressure from the pressure regulator valve 110 is thus conducted through the conduit 134, the lockup control valve, the conduit 132, the annular passage 128, the annular chamber 61 and the radial passages 74, and then supplied into the clutch chamber 70. The fluid under pressure from the pressure regulator valve 110, on the other hand, is conducted through the conduit 104, the axial passage 94, the radial passage 98, the fluid chamber 100 and the inlet passage 102, and then charged in the working circuit of the torque converter 12. The fluid discharge from the converter working circuit is delivered through the outlet passage 118, the annular passage 116, the passage 112, the axial passage 96 and the passage 120, and then supplied to the relief valve 122. The relief valve 122 functions to maintain the charging pressure in the converter working circuit at a predetermined value. The fluid passed by the relief valve 122 then flows into the oil sump 108 by way of the oil cooler 124 and the lubricating points 126.

When the lockup control valve unit 130 is conditioned to effect the fluid circulation as above, the force of the fluid pressure acting on one axial side of the clutch piston 62 counterbalances the force of the fluid pressure acting on the other axial side. This results in the lockup-released condition of the lockup clutch unit 14 with the friction surfaces 66 and 68 being disengaged.

In this lockup-released condition, the hydrokinetic torque converter assembly 10 establishes a hydrokinetic torque delivery path between the engine crankshaft and the transmission input shaft 52 and the charging pressure in the converter working circuit is maintained at a predetermined value. That is, the driving power produced by the engine is transmitted from the engine crankshaft to the impeller 40 through the converter cover 16. The driving power is then transmitted from the impeller 40 to the transmission input shaft 52 through the turbine 42 with a torque multiplied by means of the stator 44 at a ratio which is variable with the revolution speed of the engine crankshaft, as is well known in the art. The transmission input shaft 52 then transmits the driving power to a ratio changing mechanism (not shown) of a power transmission.

When the vehicle is in the conditions suitable for the lockup of the torque converter 12, for example the conditions in which a top gear is produced in the transmission and the vehicle speed is higher than a predetermined level, the lockup control valve unit 130 connects the fluid conduit 132 to the drain conduit 136 leading to the oil sump 108. The fluid pressure in the clutch chamber 70, which is substantially the same as the fluid pressure in the converter working circuit, is relieved through the radial passages 74, the annular chamber 61, the annular passage 128, the conduit 132 and the lockup control valve unit 130. The clutch piston 62 is thus subject to the force, which is caused by the pressure difference across the piston 62, effective to urge the piston to move to the right as viewed in the drawing. The clutch piston 62 moves to the right causing the friction surfaces 66 and 68 to engage each other. The lockup clutch piston 62 rotates integrally with the converter cover 16 and therefore the impeller 40. The driving force thus directly transferred to the lockup clutch piston 62 from the converter cover 16 is then mechanically transferred to the turbine 42 by way of the torsional damper assembly 82. The torsional damper assembly 82 functions to damp and absorb the shocks and vibrations which take place at the initial stage of the application of the lockup clutch 14. In the lockup-applied condition as above, the hydrokinetic torque converter assembly 10 establishes a mechanical torque delivery path by-passing the torque converter 12. That is, the impeller 40 is connected in direct-drive relationship to the turbine 42 through the converter housing 16 and the torsional damper assembly 82.

Figure 2:
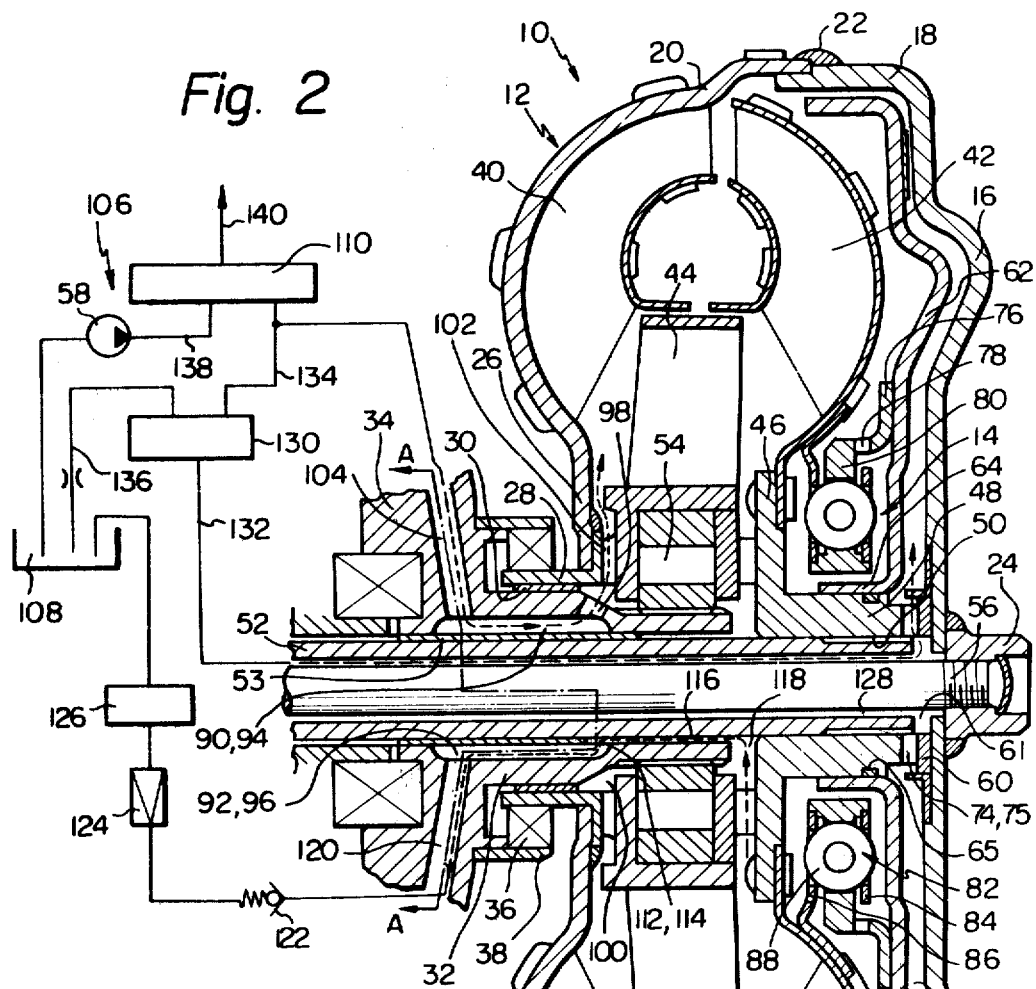
FIG. 2 shows, partly in a fragmentary sectional manner and partly in a schematic manner, a preferred embodiment of a torque converter assembly having a lockup circuit unit according to the present invention.
Figure 4:
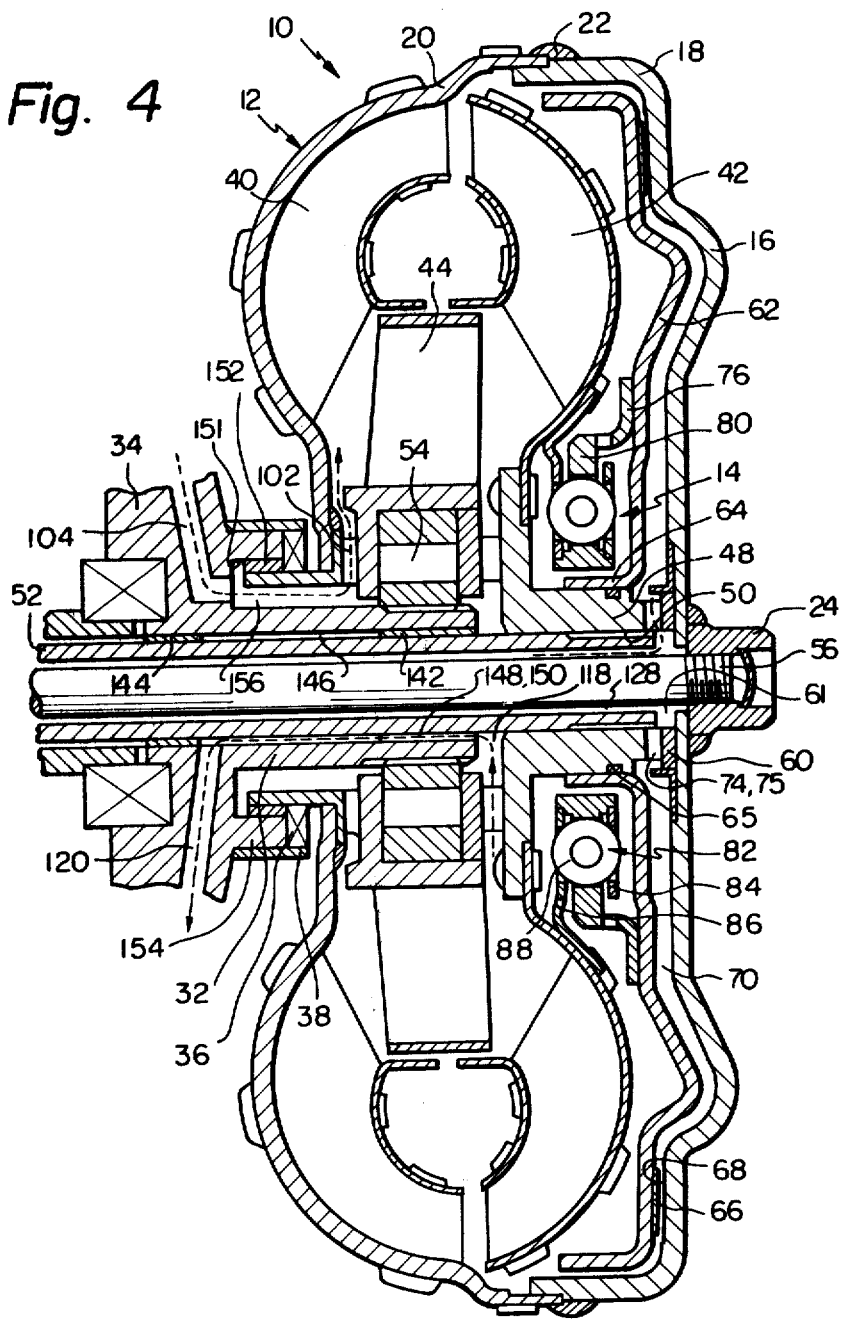
FIG. 4 shows another preferred embodiment of a torque converter assembly having a lockup unit according to the present invention.

Referring to FIG. 4, a second embodiment of a hydrokinetic torque converter assembly of this invention is explained. In the second embodiment of FIG. 4, like parts to the first embodiment of FIGS. 2 and 3 will be given same reference numerals and will not be described again to avoid useless repetition. In the second embodiment, the bushing 53, the axially extending grooves 90 and 92 and the radial passage 98 of FIGS. 2 and 3 have been replaced by a pair of bushings 142 and 144 disposed between the transmission input shaft and the stationary sleeve shaft extension. The pair of bushings 142 and 144 are axially spaced from each other to define therebetween the axial ends of an annular passage 146. The forward bushing 142 is formed with a slit 148 axially extended throughout the length thereof to define an axially extending passage 150. The passage 150 and the annular passage 146 constitute a portion of the converter fluid return circuit for conducting the fluid discharged from the torque converter 12 to the reservoir 108. The second embodiment of FIG. 4 is further distinct from the first embodiment of FIGS. 2 and 3 in that the pilot sleeve shaft 28 is received within a bore 151 by interposing a bushing 152 between the bore 151 and the outer surface of the pilot sleeve shaft 28. The bore 151 is formed in an annular extension 154 projected from the cover member 34 and is concentrically disposed about the stationary sleeve shaft extension 32. Between the pilot sleeve shaft 28 and the stationary sleeve shaft 32 is defined an annular space 156 which provides communication between the inlet passage 102 of the torque converter 12 and the conduit 104. The second embodiment of the hydrokinetic torque converter assembly 10 provided with the above modifications produces exactly the same effects as the first embodiment of FIGS. 1 and 2.

From the description thus far made, it is to be noted that the hydrokinetic torque converter assembly of the lockup clutch unit-equipped type according to the present invention features that it is constructed and arranged (1) to utilize the space between the stationary sleeve shaft extension 32 and the transmission input shaft 52 as the converter fluid return passage 114 and 116 or as the converter fluid return passage 146 and 150 constituting a portion of a converter fluid return circuit for delivering the fluid discharged from the torque converter 12 to the oil sump 108, (2) to form, between the stationary sleeve shaft extension 32 and the bushing 53 received therewith or between the stationary sleeve shaft extension 32 and the pilot sleeve 28, a converter fluid supply passage 94 or 156 which constitutes a portion of a converter fluid supply circuit for supplying the fluid under pressure from the source 106 to the converter working circuit, and (3) to utilize the space between the pump drive shaft 56 and the transmission input shaft 52 only as the lockup control passage 128 constituting a portion of a lockup control circuit for alternatively actuating the lockup clutch unit 14 into a lockup-applied condition or a lockup-released condition.

It is to be further noted that the hydrokinetic torque converter assembly of this invention also features that a pair of fluidly isolated axial passages 94 and 96 are defined between the bushing 53 and the bore of the stationary sleeve shaft extension 32 and respectively utilized as a fluid supply passage and a fluid return passage.

From the foregoing, it is now to be understood that the hydrokinetic torque converter assembly of the lockup clutch unit-equipped type according to the present invention is constructed and arranged to make it possible to have a solid pump drive shaft 56 without any fluid passage formed therein and a transmission input shaft 52 without any radial fluid passage formed therein. The transmission input shaft 52 and the pump drive shaft 56 which are superior not only in mechanical strength but also manufacturing cost, are thus available according to the present invention.

What is claimed is:

1. A hydrokinetic torque converter assembly of the lockup clutch unit-equipped type comprising:
  a rotatable converter cover, an impeller drivingly connected to said converter cover, a turbine and a stator operatively associated with said impeller to define a converter working circuit, a pump drive shaft drivingly connected to said converter cover, a stationary sleeve shaft extension carrying thereon said stator and concentrically disposed about said pump drive shaft, an aperture free hollow transmission input shaft drivingly connected to said turbine and concentrically disposed between said pump drive shaft and said stationary sleeve shaft extension, a pilot sleeve shaft integrally connected to said converter cover and rotatably carried by said stationary sleeve shaft extension, said pilot sleeve shaft being concentrically disposed about said stationary sleeve shaft extension, a lockup clutch unit including a clutch piston which is cooperative with said converter cover to define therebetween a clutch chamber, said clutch piston being drivingly connected to said turbine and movable toward and away from said converter cover to engage and disengage said converter cover in response to the fluid pressure in said clutch chamber;
  means defining a lockup control fluid passage between said pump drive shaft and said transmission input shaft, said lockup control fluid passage communicating with said clutch chamber;
  means defining a first converter fluid passage located between said transmission input shaft and said pilot sleeve, said first converter fluid passage communicating with said converter working circuit; and
  means defining a second converter fluid passage between said transmission input shaft and said stationary sleeve shaft extension, said second converter fluid passage communicating with said converter working circuit.

2. The improvement in a hydrokinetic torque converter assembly as claimed in claim 1, in which said lockup control fluid passage defining means comprise the outer peripheral surface of said pump drive shaft and the bore of said transmission input shaft.

3. The improvement in a hydrokinetic torque converter assembly as claimed in claim 1, in which said first converter fluid passage defining means comprise a bushing disposed between said transmission input shaft and said stationary sleeve shaft extension, and an axially extending groove formed in a bore portion of said stationary sleeve shaft extension in contact with said bushing wherein said first converter fluid passage comprises an axially extending supply passage portion defined by the outer peripheral surface of said bushing and said axially extending groove.

4. The improvement in a hydrokinetic torque converter assembly as claimed in claim 3, in which said converter first fluid passage defining means further comprises a radial bore formed in said stationary sleeve shaft extension wherein said converter first fluid passage further comprises a radial supply passage portion defined by said radial bore.

5. The improvement in a hydrokinetic torque converter assembly as claimed in claim 1, in which said converter fluid passage defining means comprise the outer peripheral surface of said transmission input shaft and the bore of said stationary sleeve shaft wherein said second converter fluid passage comprises an annular return passage portion defined by the outer peripheral surface of said transmission input shaft and the bore of said stationary sleeve shaft extension.

6. The improvement in a hydrokinetic torque converter assembly as claimed in claim 5, in which said second converter fluid passage defining means further comprise a bushing disposed between said transmission input shaft and said stationary sleeve shaft extension and an axially extending groove formed in a bore portion of said stationary sleeve shaft extension in contact with said bushing wherein said second converter fluid passage further comprises an axially extending return passage portion defined by the outer peripheral surface of said bushing and said axially extending groove.

7. The improvement in a hydrokinetic torque converter assembly as claimed in claim 6, in which said bushing formed with a notch which defines a passage providing communication between said annular return passage portion and said axially extending return passage portion.

8. The improvement in a hydrokinetic torque converter assembly as claimed in claim 1, in which said first converter fluid passage defining means comprise the outer peripheral surface of said stationary sleeve shaft extension and the bore of said pilot sleeve shaft wherein said converter fluid supply passage comprises an annular supply passage portion defined by the outer peripheral surface of said stationary sleeve shaft extension and the bore of said pilot sleeve shaft.

9. The improvement in a hydrokinetic torque converter assembly as claimed in claim 5, in which said second converter fluid passage defining means further comprise a pair of bushings disposed between said transmission input shaft and said stationary sleeve shaft extension, said bushings being axially spaced from each other to define the axial ends of said annular return passage portion, one of said bushings being formed with a slit axially extending throughout the length thereof wherein said second converter fluid return passage further comprises a return passage portion defined by said slit.

10. The improvement in a hydrokinetic torque converter assembly in claim 1, in which:
one of said first and second converter fluid passages is adapted to supply fluid under pressure into said converter working circuit, and
the other of said first and second converter fluid passages is adapted to discharge the fluid from said converter working circuit.

11. A hydrokinetic torque converter assembly of the lockup clutch unit-equipped type including a rotatable converter cover, comprising:
an impeller cover drivingly connected to said converter cover;
a turbine and a stator operatively associated with said impeller to define a converter working circuit;
a pump drive shaft drivingly connected to said converter cover;
a stationary sleeve shaft extension carrying thereon said stator and concentrically disposed about said pump drive shaft;
an aperture free hollow transmission input shaft drivingly connected to said turbine and concentrically disposed between said pump drive shaft and said stationary sleeve shaft extension;
a pilot sleeve shaft integrally connected to said converter cover and rotatably carried by said stationary sleeve shaft extension, said pilot sleeve shaft being concentrically disposed about said stationary sleeve shaft extension;
a lockup clutch unit including a clutch piston which is cooperative with said converter cover to define therebetween a clutch chamber, said clutch piston being drivingly connected to said turbine and movable toward and away from said converter cover to engage and disengage said converter cover in response to the fluid pressure in said clutch chamber;
said stationary sleeve shaft extension and said hollow transmission input shaft defining therebetween a first annular passage;
said hollow transmission input shaft and said dump drive shaft defining therebetween a second annular passage which fluidly communicates with said clutch chamber;
means defining a first elongate groove in the inner surface of said stationary sleeve shaft extension;
means defining a second elongate groove in the inner surface of said stationary sleeve shaft extension;
a bush disposed in said stationary sleeve shaft extension which closes said first and second elongate grooves to form first and second chambers, said first chamber defining part of a first passage structure which communicates with the interior of torque converter; and
means defining a notch in said bush for communicating said second chamber with said first annular passage, said second chamber and said first annular passage defining part of a second passage structure which communicates with the interior of said torque converter.

* * * * *